May 19, 1964     K. KUCHENBECKER     3,133,525
TETHERING HALTER
Filed Feb. 27, 1962
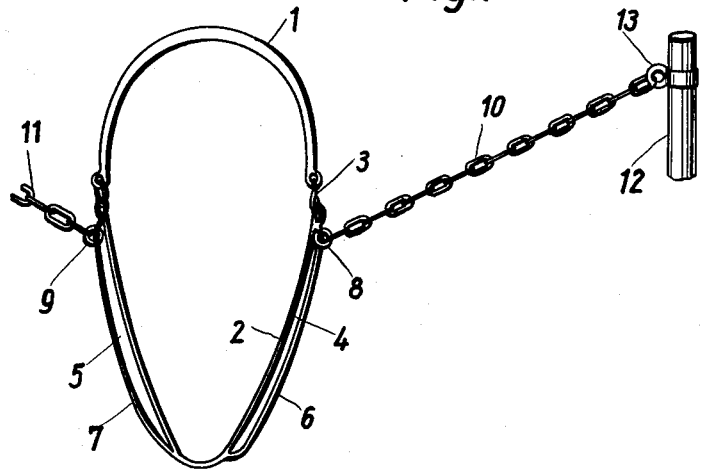
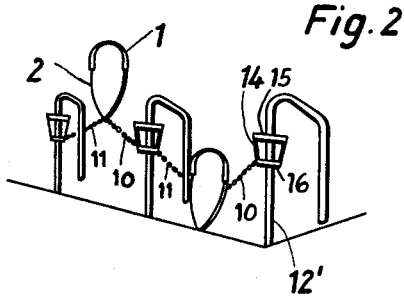
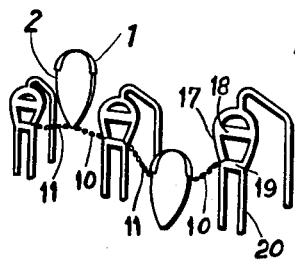
Inventor:
KARL KUCHENBECKER
BY Robert W. Beach
ATTORNEY

United States Patent Office 3,133,525
Patented May 19, 1964

3,133,525
TETHERING HALTER
Karl Kuchenbecker, Zuckerberg 29, Trier, Germany
Filed Feb. 27, 1962, Ser. No. 175,907
Claims priority, application Germany Mar. 1, 1961
5 Claims. (Cl. 119—119)

The present invention relates to a halter for tethering domestic animals such as cows.

The conventional tethering devices generally consist of a chain which is placed around the neck of the animal when it is to be tied within a stall, barn or stable, while to the lower end of this neck chain other chains are connected which are secured laterally to the stall posts or stable walls. Such a tethering device which has been customary for ages has the disadvantage that it leaves the cow a considerable amount of free movement with the result that the cow will often step with her front feet into the feed trough or it permits her to move back so far that, when lying down, she will lie in the manure gutter.

In order to overcome the above-mentioned disadvantage, a tethering device has been proposed, such as in U.S. Ingraham Patent 2,294,781, in which underneath a more or less rigid neck yoke a slide rod is provided which is movable upwardly and downwardly in lateral guides on the posts or walls defining the stall of the animal. In the practical use of such a tethering device it has, however, been found that often the guide means of the slide rod or of the chain links which are connected thereto will become wedged so that a frictional resistance is produced which can hardly be overcome by the cow and which prevents her from standing up or lying down freely whenever wanted. It has also been found to be a very considerable disadvantage that at every movement of the cow the interengaging metal parts of such a tethering device produce a loud rattling noise.

It has also not been possible to avoid these disadvantages by replacing the slide rod by chains which are connected at one end to the neck yoke and at the other end through slide tubes or the like to the posts which define the stall of the animal, such as in U.S. Ward Patent 1,309,497. If the chains of such a tethering device are sufficiently short to prevent the animal from stepping too far forwardly or to the rear, the friction between the end links of the chain or the slide tube and the guide rod or post is very great since the tension is applied substantially at a right angle and the forces coming from the head of the animal must first be transmitted through the chains. The cow is then prevented from moving her head freely since she can lift or lower her head or move it sideways only for a short distance. If, however, the chains are lengthened, the above-mentioned disadvantages occur inasmuch as the animal can then move too freely.

It is an object of the present invention to provide a tethering halter for cows and similar animals which consists of a chain or band neck collar and securing tie means, such as chains, ropes, rods, or the like which extend separately from each other toward both sides from the neck collar and are adapted to move upwardly and downwardly along the neck yoke.

In observing the actions of cows it has been found that the cow can move her head much more freely if the neck yoke is slidable relative to the posts on which it is secured. It is then possible, for example, when the cow tilts or turns her head, generally about the axis of her neck, that one tethering chain is located at the upper end of the guide means on the neck collar, while the other chain is at the lower end. When lying down, the cow can then lay her head easily on the side. When she is standing, the neck ends of the two chains will be located closely adjacent to each other at the lower end of the neck yoke so that the cow can easily swing her head toward the rear, generally about an upright axis, which is impossible when the cow is tethered tightly, for example, by means of chains which are nonadjustably connected to the center of the neck yoke at its opposite sides and are short and firmly anchored.

According to a preferred embodiment of the invention, a neck collar which consists of two or more parts and may be opened or closed by a suitable quick-action lock is provided on both sides with guide rods which are spaced from the collar itself but parallel to it and have stops on their upper and lower ends. To each of these lateral guide rods is connected one end of a tie, such as a chain, by an end ring or a chain link which is slidable upwardly and downwardly on the guide rod. The outer ends of the two ties are secured to posts or walls which define or form a part of the stall of the animal. This slidable construction permits the two ties extending outwardly away from the neck collar to be quite short without unduly restricting the movements of the animal. The cow will then always be able to lift and lower her head or to tilt or turn it in either direction since in any such movement the inner or neck ends of one or both chains will slide upwardly or downwardly along the guide rods. Also, when raised, the cow can swing her head sideways freely in either direction.

These guide rods are preferably curved generally parallel to the neck collar sides in accordance with the cross-sectional shape of the neck of a cow, converging downwardly.

Either the neck collar may be of rigid construction or its different parts may be flexibly connected to each other by several links. It may consist of spring steel, plastic, or any other suitable material, while the lateral ties may consist of chains, ropes, steel links, bars, or the like of any suitable material which has a considerable tensile strength.

The free movability of the tethered animal when its head is raised may be further improved by connecting the outer or anchored ends of the tethering ties to guide rods which are mounted on the posts of the stall so as to converge upwardly. These guide rods are preferably slightly curved so that such convergence decreases progressively upward, and it is especially advisable to make the upper third of each guide rod more nearly vertical than the lower third.

These as well as additional features of the present invention will become more clearly apparent from the following detailed description of several preferred embodiments thereof which are illustrated in the accompanying drawings, in which—

FIGURE 1 is a front or rear elevational view of a tethering stanchion according to the invention;

FIGURE 2 is a diagrammatic perspective view on a reduced scale of two adjacent cow stalls according to the invention which are provided with tie guides on the lateral posts; while FIGURE 3 is a similar view showing a modified type of tie guides.

The tethering halter according to the invention consists of a neck collar which comprises an upper collar part 1 and a lower U-shaped part 2 which may be connected to each other by a suitable lock, for example, a spring hook 3. The lower collar part 2 is provided at the outside of both sides with elongated guide rods 6 and 7 which are generally parallel to but spaced from the actual collar part 2 by long slots 4 and 5 extending generally between the central portion and the bottom of the collar and along which chain rings 8 and 9 on the ends of chain ties 10 and 11 are slidable. The other ends of chains 10 and 11 are secured to eyes 13 anchored to lateral posts 12 which define the stall or stable area for one animal. The eyes 13 by which the chains 10 and 11 are secured to the posts 12 should be disposed in a position lower than the position of the lower ends of the guide rods 6 and 7 and of slots 4 and 5 when the cow is standing but higher than the position of the upper ends of these guide rods and slots when the cow is lying down. The entire collar is curved in conformance with the shape of the animal's neck, and the guide rods 6 and 7 are curved correspondingly. This insures that the chains will remain relatively tight in any position of the cow without hindering her movements.

In place of the eye 13, posts 12' are preferably also provided with tie guides 14 as illustrated in FIGURES 2 and 3 which converge upwardly. Each of these tie guides 14 shown in FIGURE 2 preferably consists of an angularly bent iron rod including a longer horizontal upper portion 15 and a shorter horizontal lower portion 16 secured to the post 12' and between which extend the inclined portions on which one end ring of the respective chain 10 or 11 is slidable, while the other end ring is connected to the lower yoke part 2 in the same manner as illustrated in FIGURE 1.

Each of these guide rods 14 is designed so that the chain is guided thereon to be slidable upwardly and downwardly. These guide rods may be either straight as shown in FIGURE 2 or curved as shown in FIGURE 3. In actual practice it has been found to be very advisable to make the front part of the post which limits the stall or standing area of the cow in the form of a double post 20, as shown in FIGURE 3. The curved guide rod 17 may in this case form an integral part of this double post. Upper and lower horizontal rods 18 and 19 may then be provided on each post at the upper and lower ends of the inclined portions 17, respectively, to limit the extent of the up and down movement of the respective chains.

In order to facilitate the work of connecting the chains to the guide rods 14 or 17, the latter may also be designed to be removable from the posts 12' or 20.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed by invention, what I claim is:

1. A tethering device for domestic animals comprising a neck collar curved substantially corresponding to the cross-sectional shape of the neck of an animal to be tethered and adapted to be placed around such neck and including an upper member, a lower U-shaped member and means flexibly and removably connecting said upper and lower members, guide rods extending along substantially the entire length of the sides of said U-shaped member, respectively, and spaced slightly therefrom, and having their upper and lower ends secured to the opposite sides of said U-shaped member, respectively, said rods having a shape curved substantially corresponding to the shape of the opposite sides of said lower U-shaped member, respectively, and a pair of tie members having ends slidably connected to said guide rods for sliding upwardly and downwardly and extending laterally away from opposite sides of said lower U-shapded member.

2. A tethering device for domestic animals comprising a neck collar adapted to be placed around the neck of the animal to be tethered and including a lower U-shaped member and means connecting the upper ends of said U-shaped member, guide rods extending along substantially the entire length of the sides of said U-shaped member, respectively, and spaced slightly therefrom, and having their upper and lower ends secured to the opposite sides of said U-shaped member, respectively, at least one pair of postlike means spaced from each other and defining therebetween an individual stall for an animal, and a pair of tie members having ends slidably connected to said guide rods for sliding upwardly and downwardly and having their outer ends connected to said postlike means, respectively.

3. A tethering device for domestic animals comprising a neck collar adapted to be placed around the neck of the animal to be tethered and including a lower U-shaped member and means connecting the upper ends of said U-shaped member, guide rods extending along substantially the entire length of the sides of said U-shaped member, respectively, and spaced slightly therefrom, and having their upper and lower ends secured to the opposite sides of said U-shaped member, respectively, a pair of stationary guide members spaced from each other and defining therebetween an individual stall for an animal, said guide members converging in an upward direction, and a pair of tie members each having one end connected to one of said guide rods and its other end connected to one of said inclined guide members for sliding upwardly and downwardly on said guide rods and said guide members.

4. A tethering device for domestic animals comprising a neck collar adapted to be placed around the neck of the animal to be tethered and including a lower U-shaped member and means connecting the upper ends of said U-shaped member, guide rods extending along substantially the entire length of the sides of said U-shaped member, respectively, and spaced slightly therefrom, and having their upper and lower ends secured to the opposite sides of said U-shaped member, respectively, at least one pair of stationary postlike means spaced from each other and defining therebetween an individual stall for an animal, guide rods on said postlike means, respectively, converging in an upward direction and slightly curved to progressively decrease the degree of convergence upwardly, and a pair of tie members each having one end connected to one of said first guide rods on said lower collar member and its other end connected to one of said second guide rods on said postlike means for sliding of both ends of each tie member upwardly and downwardly on the respective guide rods.

5. The tethering device defined in claim 4 in which each of the stationary postlike means also defines the front limits of the individual stall for an animal, and each of said postlike means includes a pair of vertical posts and upper and lower transverse members connected to and supporting the second guide rods near their upper and lower ends, respectively, from said posts.

References Cited in the file of this patent

UNITED STATES PATENTS

| | | |
|---|---|---|
| 672,134 | Pugh | Apr. 16, 1901 |
| 1,309,497 | Ward | July 8, 1919 |
| 2,294,781 | Ingraham | Sept. 1, 1942 |

FOREIGN PATENTS

| | | |
|---|---|---|
| 458,671 | Germany | Apr. 17, 1928 |